Jan. 27, 1953 H. C. READING 2,626,465
ANGLE MEASURING DEVICE
Filed Feb. 25, 1947 3 Sheets-Sheet 1
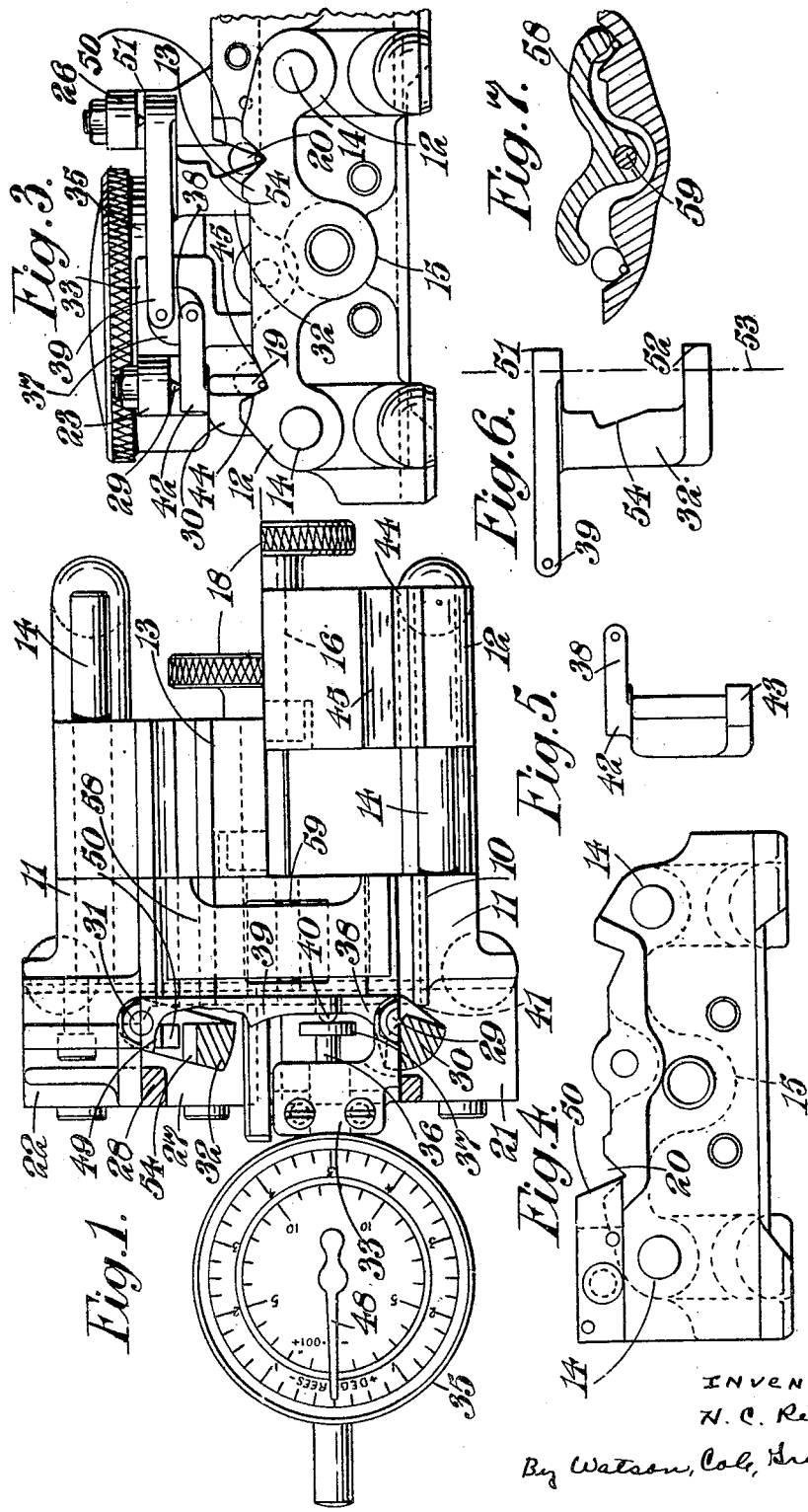
INVENTOR
H. C. Reading
By Watson, Cole, Grindle & Watson

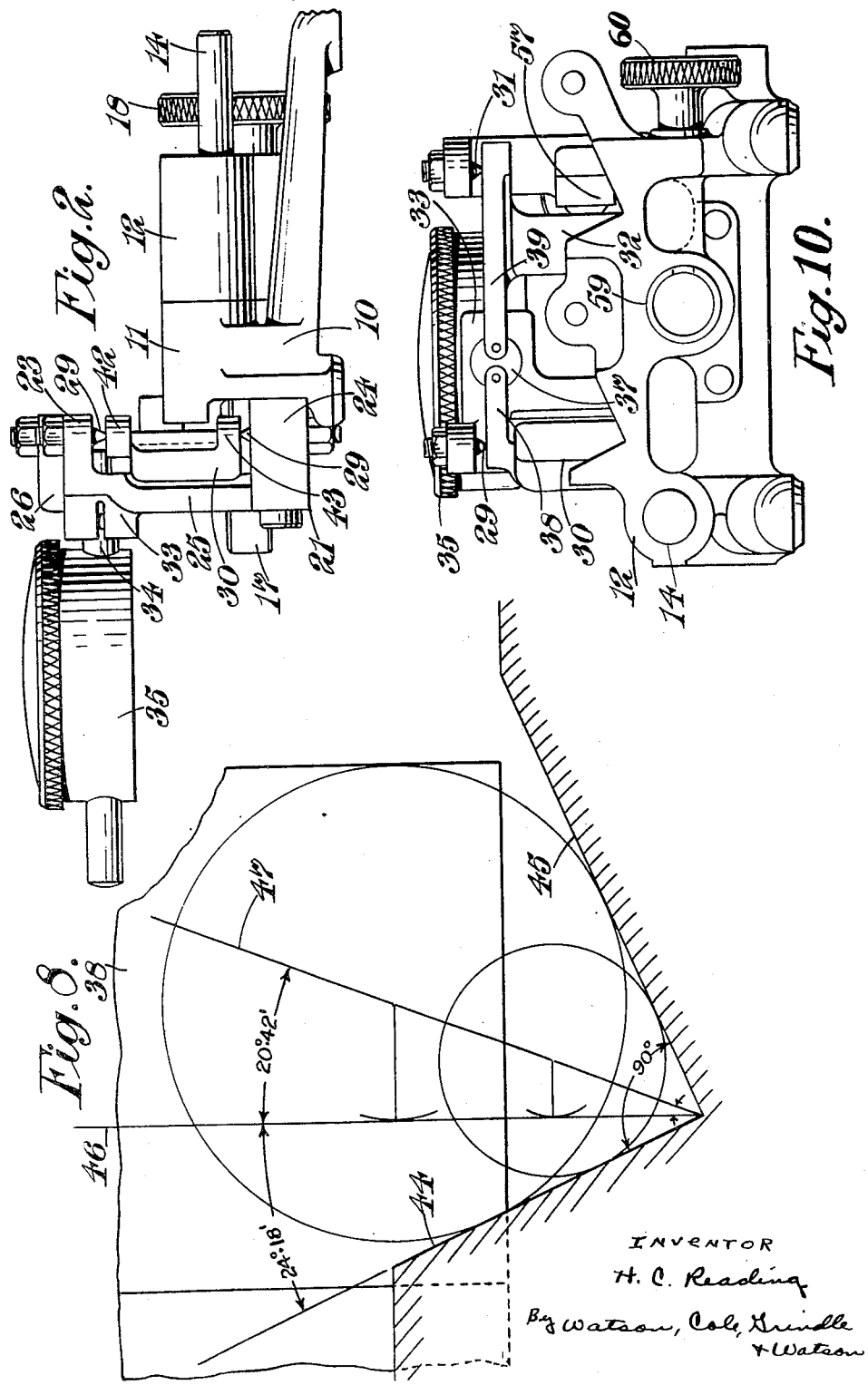

Jan. 27, 1953   H. C. READING   2,626,465
ANGLE MEASURING DEVICE

Filed Feb. 25, 1947   3 Sheets-Sheet 3

INVENTOR
H. C. Reading
By Watson, Cole, Grindle
& Watson

Patented Jan. 27, 1953

2,626,465

UNITED STATES PATENT OFFICE 2,626,465

ANGLE MEASURING DEVICE

Harold Cornelius Reading, London, England, assignor to Coventry Gauge & Tool Company Limited, Coventry, England, a British company Application February 25, 1947, Serial No. 730,796
In Great Britain November 8, 1945

Section 1, Public Law 690, August 8, 1946
Patent expires November 8, 1965

6 Claims. (Cl. 33—201)

This application corresponds to the application of Harold Cornelius Reading, No. 29,817/45 which was filed in Great Britain on November 8, 1945.

This invention relates to angle measuring devices particularly for use in finishing or resetting the cutting edges of twist drills. A twist drill is usually provided with two helical flutes extending from a pointed extremity along the shank of the drill, which flutes provide at the pointed extremity two approximately conical faces disposed on either side of the longitudinal axis of the drill, each of which faces is backed away from a cutting edge where the conical face meets the flute. These cutting edges lie at an angle to the longitudinal axis. It is found in practice that the accuracy of the size of the hole drilled depends on the angles between the two faces and the longitudinal axis being equal and on the accuracy at which the junction of the cutting edges lies on the aforesaid longitudinal axis of the drill. An object of the present invention is to provide means whereby the aforesaid angle and the position of the junction of the cutting edges in relation to the longitudinal axis may be accurately determined.

According to this invention, a method of finishing or resetting the cutting edges of a twist drill consists in measuring the angle each cutting edge makes with the longitudinal central axis of the drill, grinding said edges so that both said angles are equal to a pre-selected angle and then measuring in an axial direction the distances between the meeting point of the cutting edges and points on the cutting edges at equal radial distances from said axis and grinding the appropriate edge so as to equalise said axial distances.

A measuring instrument suitable for use in the above method comprises means for so locating one face of the drill or the like that it may be slid along said locating means, an abutment member pivotally mounted in the path of movement of the end of the drill or the like so as to pivot about an axis transverse to the direction of said movement and so as to engage an inclined end face of the drill or the like, and an indicator associated with said abutment member and arranged to magnify the movement thereof.

The indicator preferably comprises any known form of dial indicator which is connected by a suitable transmission to said pivoted abutment member.

A dial indicator usually embodies a spring plunger, and in one construction according to this invention, the spring plunger is arranged to abut against a part of the pivoted abutment member disposed away from the pivot axis thereof. For example, a lever-arm may be secured to the pivoted abutment member, which lever-arm may be provided with a spherical nosepiece which is arranged to abut against a flat face of the spring plunger of the clock.

The aforesaid locating means may comprise a channel having a flat supporting face and having an upwardly extending flat faced wall at an appropriate angle to the supporting surface, for example, at right angles. With such an arrangement, the article to be measured is supported by said platform and pressed against the upstanding wall, along which it may be slid into contact with said pivoted abutment member.

Means are provided for mounting the aforesaid pivoted abutment member and the dial indicator at the end of the channel so that the axis of pivoting is disposed away from the inner face of said upstanding wall.

In the case where the device is to be used for measuring the angle between the conical faces of different sized twist drills over a considerable range, it is desirable that the axis of pivoting of said abutment member shall, for all drills, lie between and preferably approximately midway between the longitudinal axis of the drill and its periphery since, if it were disposed inside the periphery it might be possible to push the drill past the abutment.

This is accomplished by so arranging the locating means that the plane bisecting the angle between the upwardly extending wall and the flat supporting face subtends an angle to the axis pivoting of the abutment member equal to or within a few degrees of equality to the angle subtended between the axis of pivoting and the upwardly extending wall.

In order that the axis of pivoting may be disposed midway between the axis and the periphery of the drill, the following conditions should be satisfied:

$$\sin \theta = \tfrac{1}{2} \sin \varphi \sin (\theta + \beta)$$

where $\theta$ is the angle between the bisecting plane and the axis of pivoting, $\varphi$ is the angle between the bisecting plane and either wall and $\beta$ is the angle between the bisecting plane and a radius of the drill which is at right angles to said bisecting plane. In the case where the angle between the walls is 90°, i. e. where $$\varphi = 45°, \theta = 20° .42'$$

The following is a description of the invention as applied to an instrument for assisting the finishing or resetting of the cutting edges of a twist drill, reference being made to the accompanying drawings, in which:

Figure 1 is a plan view of the instrument showing at the top right-hand end thereof the adjustable drill support at one limit of its travel and the bottom right-hand part at the other limit of its travel, and also showing the two pivotally mounted abutments partly in horizontal cross-section;

Figure 2 is a side elevation of the instrument;

Figure 3 is an end elevation looking from the right of Figures 1 and 2 of the adjustable drill support;

Figure 4 is a similar view to Figure 3 but looking from the left of the instrument shown in Figures 1 and 2, but with certain of the parts removed;

Figure 5 is a front elevation of the adjustable abutment used in that part of the instrument for testing the equality of the angles of the cutting edges;

Figure 6 is a front elevation of the adjustable abutment used in that part of the instrument for testing whether or not the meeting point of the cutting edges lies on the central longitudinal axis of the drill;

Figure 7 is a cross-section through a part of the drill support showing a drill steady in position;

Figure 8 is a diagrammatic view showing how by disposing the walls of a drill support in relation to the pivot axis of one of the pivotally mounted abutments, the centre of the drill, whatever its size, may be located so that the axis of pivoting of the abutment passes through the center or near the center of a radius of the drill;

Figure 10 is an end elevation of the latter arrangement, looking from the right of Figure 9.

Figure 9:
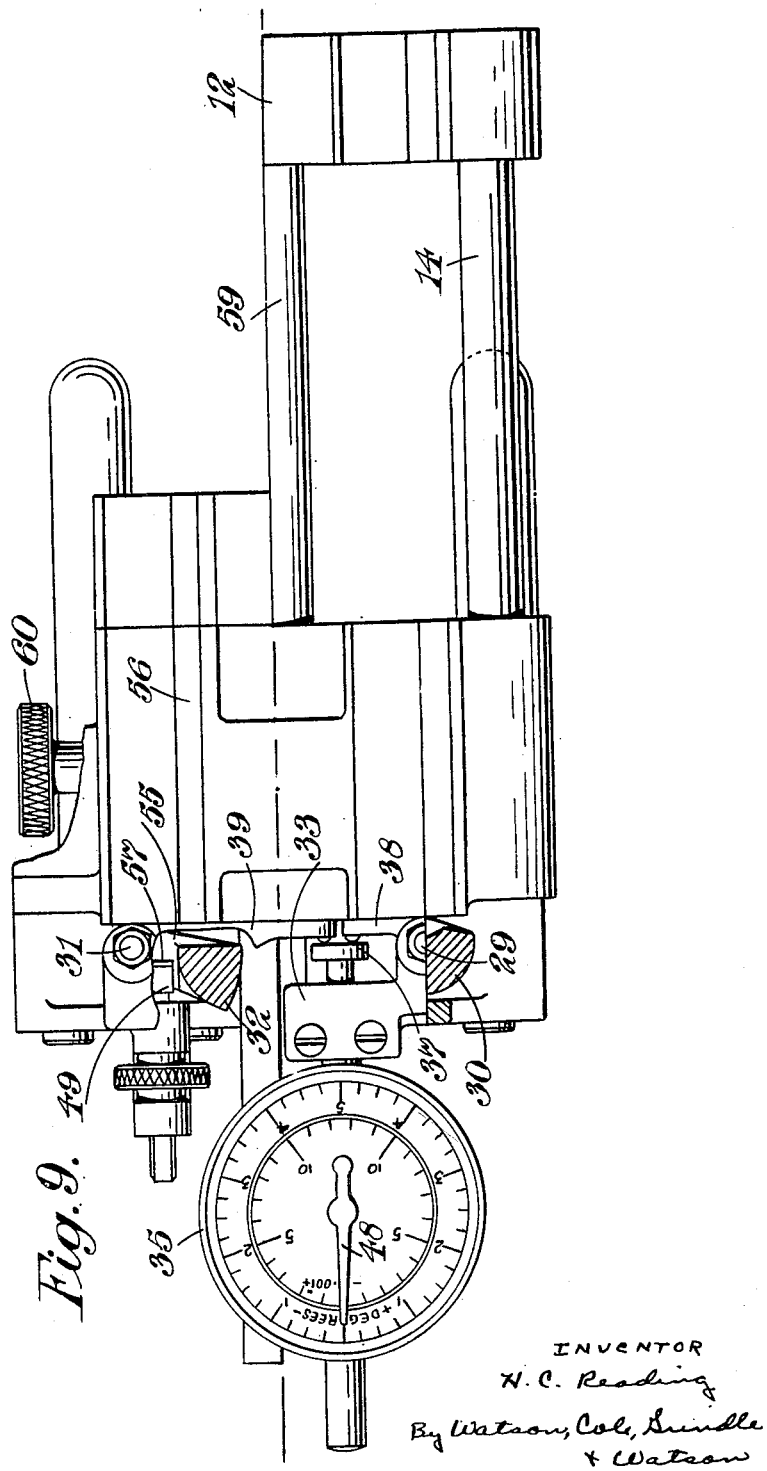
Figure 9 is a similar view to Figure 1 showing an alternative form of device for effecting the second of the two measurements.

Referring to the assembled construction shown in Figures 1 and 2, the instrument comprises a body part 10 having two upstanding bosses 11 which are initially formed integrally with extensions 12, which two bosses are joined integrally together by a yoke-piece 13. During the process of manufacture, the bosses and yoke piece are cut across their width, and there are fixed in the two bosses remaining on the main body part, horizontally-extending pins 14 which slidably engage holes in the severed boss portions 12. On the under side of the yoke-piece 13 between the bosses 12 is a third boss 15, arranged to provide a bearing for the journal portion 16 of a lead screw 17 which extends through a threaded hole in the yoke-piece which connects together the two stationary bosses 11. Shoulders are formed on the journal portions of the lead screw so as to lie on either side of the boss 15. The lead screw is provided with a suitable adjusting head 18. The upper faces of the yoke-pieces between the two bosses 11 and the two bosses 12 are provided with two drill locating channels 19 and 20. Thus, by rotating the manipulating head 18, the effective length of the locating channels may be adjusted. As will be explained later, the process of testing a drill involves bringing its end against an abutment and rotating the drill by gripping its other end between the fingers. By providing the instrument with means for adjusting the drill-locating channels 19 and 20, it can be ensured that whatever the length of the drill is, within certain limits, its end may project beyond the locating channel and can thus be gripped.

Fixed to the left-hand end of the body part 10 as seen in Figure 1, are two bracket-members 21 and 22, the former being provided with upper and lower spaced arms 23 and 24, joined by an upright 25, and the latter being provided with similar arms 26 and 27 joined by an upright member 28. Mounted on pivot bearings 29 between the arms 23 and 24 is a pivotal abutment 30, while mounted on pivot bearings 31 between the arms 26 and 27 is a second pivotal abutment 32. The upright 25 is also provided at its upper end with a socket having a split portion 33 arranged to grip the stem 34 of a dial indicator 35. The plunger 36 of the clock extends to a position between the two pivotal abutments, and is provided with a head 37 having a flat face normal to the axis thereof. The pivotal abutments 30 and 32 are provided respectively with lever arms 38 and 39, the former arranged below the latter, and each provided with a spherical projection 40 for engaging the flat face of the head of the plunger.

As will be seen from Figure 1, the pivotal abutment 30 is provided with a flat face 41 which extends on either side of the axis of the pivotal bearing 29. The upper and lower ends of the face 41 terminate in bosses 42 and 43 respectively, which are provided with hard metal inserts (not shown), having small conical recesses for engagement by the pivotal bearings 29. The flat face 41 is so arranged that it may engage one or other of the conical faces at the end of the twist drill.

As will be seen from Figure 3, the channel 19 is provided with upwardly-extending walls 44 at a comparatively small angle to the vertical, and a supporting face 45 at right angles thereto.

Referring to Figure 8, in which the line 46 represents the axis of the pivotal bearing 29, it will be noted that the particular dispositions of the walls 44 and 45 are so selected that the angle which a bisecting plane 47 makes with the axis 46 is slightly less than the angle the axis 46 makes with the upstanding wall 44. With this arrangement, the axis 46 will be arranged approximately midway along the radius of any sized drill to be measured. The angle between the bisecting plane and the axis of pivoting may be obtained from the expression: $\sin \theta = \frac{1}{2} \sin \phi \cdot \sin (\theta + \beta)$ as set out earlier in the specification.

The dial indicator 35 is provided with the usual means for setting the scale to zero with relation to the pointer 48.

In using the device for measuring the angle of the two cutting edges in the twist drill, there is first arranged in the device a test-piece having a flat side face which is brought into engagement with the flat upwardly-extending wall 44, and having an end face at an angle corresponding to the required angle between a cutting edge and the axis of the drill. The test-piece is slid along said upstanding wall until the end face contacts with the pivoted abutment 30, which will rotate about the axis of the pivot bearing 29 until its face 41 is parallel with said end face. The clock dial is then set to zero. The test-piece is removed and the twist drill is placed in the device and is moved longitudinally until its end comes into contact with the abutment face 41. Since, however, the two end faces of the drill are not strictly conical, it is necessary to twist the drill about its longitudinal axis until the cutting edge lies substantially in the plane of the abutment face. The correct position is readily determined by noting the clock reading since, during the rotation movement, the pointer will reverse its direction, and the point of reversal indicates when the cutting edge is flat against the abutment face. This reading is then noted, and if it differs from the reading obtained with the test-piece, this indicates that the drill face is incorrectly ground. A table may be provided for calibrating the dial reading in terms of angle. The twist drill is then reversed until its other cutting edge is in line with the abutment face and another reading of the clock is obtained. By these means, it can readily be ascertained to what extent the drill requires to be reground, and in what sense. So far, however, such means do not determine whether the junction between the two cutting edges lies on the longitudinal axis of the drill. It will be appreciated that if it does not lie on the longitudinal axis, then the junctions between the two end faces of the drill and the sides of the drill will not lie on the same circumference, i. e. one end face will be in advance of the other. This may be determined by use of the other pivotal abutment 32.

In addition to this pivotal abutment, there is arranged at the left-hand end of the channel 20, as viewed in Figure 1, a fixed abutment 49 which, as is best seen in Figure 4, is provided with a face 50 inclined to the vertical.

Referring now to Figure 6, the upper and lower ends of the pivotal abutment 32 are provided respectively with bosses 51 and 52 which are provided with hard metal insets, not shown, having small conical depressions for engaging the pivot bearings 31. The line 53 represents the axis of rotation of the pivotal member.

The upright face of the pivotal abutment directed towards the axis 53 has at least a part thereof at 54 inclined to the axis, the arrangement being such that the inclined portion 54 is arranged on the opposite side of the pivotal axis to the inclined face 50 of the fixed abutment, which inclined faces are arranged at the same angle to the axis.

As will be seen from Figure 3, the two walls of the channel 20 are arranged at equal angles to an intersecting vertical plane. The two inclined faces 54 and 50 may be arranged to intersect at the level of the bottom of the channel 20 or slightly below it. With this arrangement, a twist drill located in the channel 20 may be pushed along until one cutting edge engages the inclined face 50 of the fixed abutment, while the other cutting edge engages the inclined face 54 of the pivotal abutment. The drill is then rotated about its longitudinal axis, maintaining the two cutting edges in engagement with the respective faces of the abutments, and the maximum reading of the dial indicator noted. The drill is then further rotated until the cutting edges engage different faces of the fixed and pivotal abutments respectively, and the drill again rotated until the maximum reading is obtained. If the two maximum readings are the same, then the point of intersection of the two cutting faces lies along the central axis of the drill. If the maximum readings are different, then the face giving the largest maximum reading requires to be ground.

In an alternative arrangement, shown in Figures 9 and 10, the pivotal abutment 32, is provided with a vertical straight edge 55 and the channel 56 has its walls so angularly disposed that whatever sized drill is accommodated by it, the point of intersection of the cutting edges always lies opposite a flat abutment face 57 of the fixed abutment 49, and at a predetermined distance from the upright edge 55 of the movable abutment 32. If desired, means may be provided for adjusting the fixed abutment 49 in a direction along the channel 56 so that its upright face 57 may be appropriately set in relation to the upright edge 55 of the pivotal abutment.

The arrangement also differs from the previous construction in that the lever arms 38 and 39 of the pivotal abutments are arranged at the same level and in that instead of providing a lead screw for adjusting the length of the supporting channels, the yoke 13 is mounted on a tube 59 and one rod 14 only, which tube is longitudinally slotted and provided with a sliding clamping nut which is engaged by a bolt 60 passing through the slot and a hole in the yoke-piece.

In operation, the drill point is brought into engagement with the face 57 of the fixed abutment and one cutting edge is brought into engagement with the aforesaid straight edge 55 of the pivotal abutment. An indication can then be obtained when the cutting edge is in engagement with the straight edge 55 by rotating the drill and obtaining on the dial indicator the point of reversal of the pivotal member. If the point of junction between the two cutting edges lies on the central longitudinal axis of the drill, no alteration of reading will be obtained if the drill is rotated to a position in which the other cutting edge is brought into engagement with the straight edge 55. If, however, the junction point is offset from the axis of the drill, then when the drill is moved from a position in which a point on one cutting edge engages the pivoted straight edge 55 to a position in which another point on the other conical face and on the same circumference as the first said point engages said straight edge 55, it has the effect that the second point will be either further away from the abutment or nearer to the abutment, thus causing the pivoted abutment 32 to swing into a new position.

In any of the arrangements referred to above, in order to assist in maintaining the drill against the two walls of either of the channels 19 or 20 along the length of the drill, there is provided a retaining member 58 which is pivotally mounted on a pin 59 fixed in the yoke-piece joining the two bosses 11. The retaining member is provided with limbs which extend over the two channels 19 and 20 and are so shaped that one end may enter an empty channel and enable the largest of the drills to be introduced into the other channel, whereafter by applying pressure to that limb which is disposed over the drill, the drill may be maintained snugly in the channel but can readily be rotated by release of the pressure on it.

I claim:

1. A measuring device for the end faces of a twist drill comprising a locating member having two channels spaced apart thereon and each adapted to guide a drill axially along it, an abutment pivotally mounted at the end of each channel, one of which abutments is arranged with its pivot axis, as viewed along the drill, within the diameter of the drill and having a flat face in the path of movement of the drill and the other of which abutments is provided with a straight edge to engage a cutting edge on an end part of the drill at a distance away from the axis of the drill and from the pivot axis of the abutment, a fixed abutment adapted to engage the point another end part of the drill when the drill is in engagement with the abutment, an indicator having a moving part which engages parts of both said pivotal abutments at distances away from their pivot axes.

2. A measuring device for the end faces of a twist drill comprising a locating member having two channels spaced apart thereon and each adapted to guide a drill axially along it, an abutment pivotally mounted at the end of each channel, one of which abutments is arranged with its pivot axis, as viewed along the drill, within the diameter of the drill and having a flat face in the path of movement of the drill and the other of which abutments is provided with a straight edge to engage a cutting edge of the drill at a distance away from the axis of the drill and from the pivot axis of the abutment, an indicator having a moving part which engages parts of both said pivotal abutments at distances away from their pivot axes, which channel is associated with the first said pivotal abutment and is provided with two flat guide faces which meet one another to form a V-channel and are so located and disposed as to satisfy the expression $$\sin \theta = \tfrac{1}{2}\sin \varphi \, \sin(\theta+\beta)$$

where $\theta$ is the angle between the bisecting plane and the axis of pivoting $\varphi$ is the angle between the bisecting plane and either wall and $\beta$ is the angle between the bisecting plane and a radius of the drill which is at right angles to a bisecting plane of V-guide and a fixed abutment associated with the second guide which lies on the opposite side of the central longitudinal axis of the drill to said edge on the pivotal abutment, which two edges diverge as they extend away from the side channel and subtend at equal angles to the axis of the pivoting of the pivotal abutment and permit the entry of the point of the drill between them.

3. A measuring device for the end faces of a twist drill comprising a locating member having two channels spaced apart thereon and each adapted to guide a drill axially along it, an abutment pivotally mounted at the end of one channel, and arranged with its pivot axis, as viewed along the drill, within the diameter of the drill and having a flat face in the path of movement of the drill and an abutment pivotally mounted at an end of the other channel and provided with a straight edge to engage a cutting edge on an end part of the drill at a distance away from the axis of the drill and from the pivot axis of the abutment, a fixed abutment also at the end of said other channel and adapted to engage another end part of the drill when the said cutting edge of the drill is in engagement with the abutment, an indicator having a reciprocable plunger, the axis of which is arranged between and transverse to the axes of pivoting of the two abutments, and which abutments are provided with extensions which engage the end of the plunger.

4. A measuring device for the end faces of a twist drill comprising a base formed with two parallel V-shaped channels spaced apart thereon, an abutment pivotally mounted on said base at the end of one channel and arranged with its pivot axis as viewed along the channel so as to lie within the diameter of the drill and having a flat face within the path of movement of the drill another abutment pivotally mounted at the end of the other channel and provided with a straight edge to engage a cutting edge of the drill at a distance away from the axis of the drill and from the pivot axis of the abutment, a fixed abutment also at the end of said other channel adapted to engage another end part of the drill when the drill is in engagement with the abutment, a gauge having a reciprocable plunger, a clamp on said face adapted to locate the gauge with the axis of said plunger parallel and between the two channels, and which abutments are provided with extensions arranged to engage the end face of the plunger.

5. A method of finishing the cutting edges of a twist drill consisting in determining the angle each cutting edge makes with the longitudinal central axis of the drill, grinding said edges so that both said angles are equal to a pre-selected angle, determining, in an axial direction, the distances between the meeting point of the cutting edges and points on the cutting edges at equal radial distances from said axis, and grinding the appropriate edge so as to equalize said axial distances.

6. A measuring device for the end faces of a twist drill comprising a locating member having two channels spaced apart thereon and each adapted to guide a drill axially along it, an abutment pivotally mounted at the end of one channel, so that its pivot axis, as viewed along the drill lies within the diameter of the drill and which abutment has a flat face in the path of movement of the drill and another abutment pivotally mounted at the end of the other channel and provided with a straight edge to engage a cutting edge on an end part of the drill at a distance away from the axis of the drill and from the pivot axis of the abutment, a fixed abutment also at the end of the latter channel and having an edge which lies on the opposite side of the central longitudinal axis of the drill to the straight edge of the pivotal abutment and adapted to engage another end part of the drill, an indicator having a moving part which engages parts of both said pivotal abutments at distances away from their pivot axes.

HAROLD CORNELIUS READING.

REFERENCES CITED

The following references are of record in the file of this patent:

UNITED STATES PATENTS

| Number | Name | Date |
|---|---|---|
| 1,521,651 | Schlaupitz | Jan. 6, 1925 |
| 1,553,878 | Romig | Sept. 15, 1925 |
| 2,098,838 | Rusnak | Nov. 9, 1937 |
| 2,226,756 | Emery | Dec. 31, 1940 |
| 2,400,498 | Geissbuehler | May 21, 1946 |
| 2,402,015 | Bowness | June 11, 1946 |

FOREIGN PATENTS

| Number | Country | Date |
|---|---|---|
| 107,055 | Sweden | Apr. 1, 1943 |
| 246,027 | Switzerland | Sept. 1, 1947 |
| 467,078 | Germany | Oct. 18, 1928 |
| 609,221 | Great Britain | Sept. 28, 1948 |
| 874,781 | France | Aug. 26, 1942 |